United States Patent  
Yano

(10) Patent No.: US 8,462,263 B2
(45) Date of Patent: Jun. 11, 2013

(54) IMAGE PICKUP APPARATUS

(75) Inventor: Hiroshi Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 12/901,855

(22) Filed: Oct. 11, 2010

(65) Prior Publication Data

US 2011/0102669 A1    May 5, 2011

(30) Foreign Application Priority Data

Nov. 4, 2009 (JP) ................. 2009-252812

(51) Int. Cl.
H04N 5/225 (2006.01)
H04N 5/222 (2006.01)
G03B 13/30 (2006.01)
G03B 17/18 (2006.01)
G03B 17/00 (2006.01)
G03B 7/02 (2006.01)

(52) U.S. Cl.
USPC ...... 348/374; 348/333.01; 348/373; 348/375; 396/147; 396/201; 396/267; 396/281

(58) Field of Classification Search
USPC ............ 348/207.99, 333.01–333.04, 333.06, 348/335, 341, 373–376; 396/147–152, 201–204, 396/267, 281, 296, 419–426, 428, 448, 535–543, 207.99, 333.01–333.04, 333.06, 396/335, 341, 373–376
See application file for complete search history.

(56) References Cited

U.S. PATENT DOCUMENTS

| 5,157,512 | A * | 10/1992 | Inada et al. ............... 386/358 |
| 2002/0012066 | A1* | 1/2002 | Nagai ......................... 348/373 |
| 2002/0051066 | A1* | 5/2002 | Shibayama et al. ...... 348/232 |
| 2004/0136703 | A1* | 7/2004 | Sasaki et al. ............... 396/30 |
| 2004/0165108 | A1* | 8/2004 | Okuda ........................ 348/375 |
| 2004/0212709 | A1* | 10/2004 | Lee et al. ............... 348/333.01 |
| 2006/0232746 | A1* | 10/2006 | Kobayashi et al. ........ 352/242 |
| 2007/0182846 | A1* | 8/2007 | Uchida et al. ............ 348/376 |
| 2007/0229694 | A1* | 10/2007 | Oshima et al. ......... 348/333.06 |
| 2008/0198253 | A1* | 8/2008 | Yanagisawa .......... 348/333.01 |
| 2008/0239142 | A1* | 10/2008 | Suzuki ..................... 348/376 |
| 2010/0039402 | A1* | 2/2010 | Okazaki .................... 345/173 |

FOREIGN PATENT DOCUMENTS

| JP | 09-055875 | 2/1997 |
| JP | 09-275516 | 10/1997 |
| JP | 2009-089114 | 4/2009 |

* cited by examiner

*Primary Examiner* — Michael Osinski
(74) *Attorney, Agent, or Firm* — Cowan, Liebowitz & Latman, P.C.

(57) ABSTRACT

An image pickup apparatus includes a body to which a lens barrel is attached, a grip portion fixed onto the body, the grip portion including a handle to be gripped in holding the body, an extension that extends from the handle to a object side, and a projection that upwardly projects from the extension, and a tally lamp unit formed on a top surface of the projection and a rear surface of the projection which is a surface opposite to an object.

11 Claims, 3 Drawing Sheets

IMAGE PICKUP APPARATUS

BACKGROUND OF THE INVENTION

1. Field of the Invention

The present invention relates to an image pickup apparatus.

2. Description of the Related Art

Japanese Patent Laid-Open No. ("JP") 2009-89114 provides a tally lamp that turns on on-camera to a front surface of an image pickup apparatus, and thus this image pickup apparatus can inform a subject person of an on-camera state. FIG. 10 of JP 09-275516 provides a tally lamp to a rear surface of a grip portion of an image pickup apparatus, and thus this image pickup apparatus can inform an operator of an on-camera state. JP 09-055875 makes transparent a grip portion of an image pickup apparatus and provides a tally lamp inside of the grip portion, enabling an operator to view the tally lamp from the top.

However, the tally lamp becomes invisible in JP 09-055875 when the operator holds the grip portion. The operator cannot visually confirm the tally lamp provided on the front surface as in JP 2009-89114 or the tally lamp provided on the rear surface as in JP 09-275516.

SUMMARY OF THE INVENTION

An image pickup apparatus according to one aspect of the present invention includes a body to which a lens barrel is attached, a grip portion fixed onto the body, the grip portion including a handle to be gripped in holding the body, an extension that extends from the handle to a object side, and a projection that upwardly projects from the extension, and a tally lamp unit formed on a top surface of the projection and a rear surface of the projection which is a surface opposite to an object.

Further features of the present invention will become apparent from the following description of exemplary embodiments with reference to the attached drawings.

DESCRIPTION OF THE EMBODIMENTS

Figure 1:
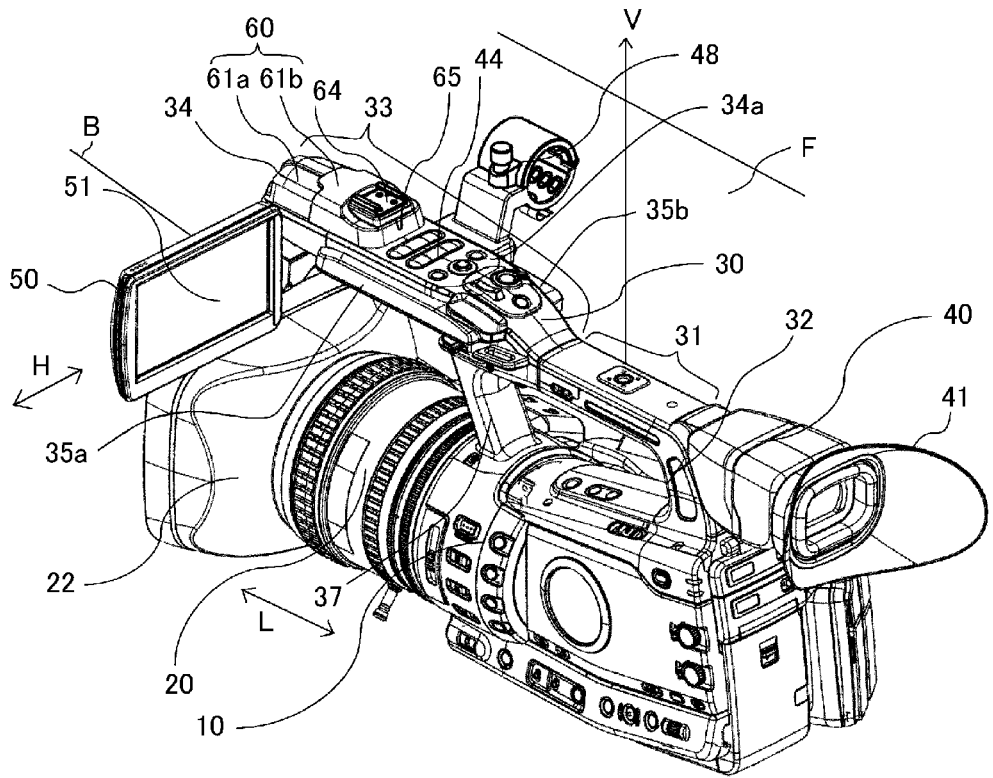
FIG. 1 is a perspective view of a backside of a video camera (image pickup apparatus) according to this embodiment.
Figure 2:
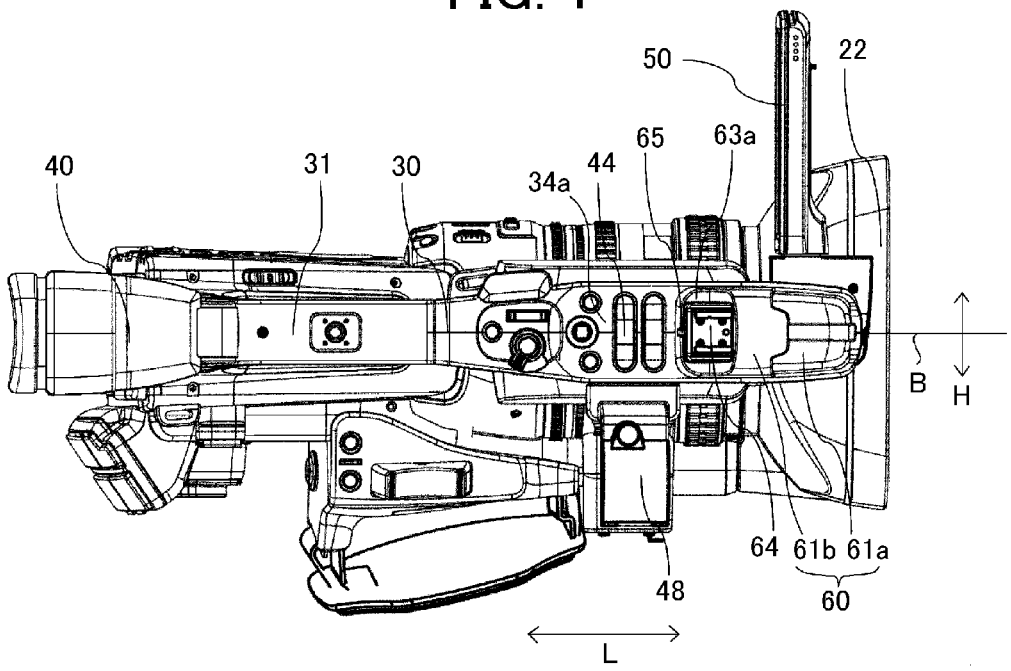
FIG. 2 is a top view of the video camera illustrated in FIG. 1.

FIG. 1 is a perspective view of a backside of a video camera (image pickup apparatus) 1, and FIG. 2 is a top view of the video camera 1. In FIG. 1, "B" denotes an incident optical axis, and "V" denotes a vertical direction. "F" denotes a plane that contains the incident optical axis B and extends in the vertical direction F when the video camera 1 is placed on a horizontal surface.

The video camera 1 includes a camera body 10 and a grip portion 30.

A lens barrel 20 is attached to the camera body 10. The camera body 10 can record and reproduce an image, and accommodates an image pickup element. The image pickup element forms an image signal of an object based on light incident from the lens barrel 20.

The lens barrel 20 is attached to a front end of the camera body 10 so that the lens barrel 20 can or cannot be detached from the front end, and the incident optical axis B is set parallel to the front and back direction (L direction) of the camera body 10. A lens hood 22 configured to shield unnecessary light incident upon the lens barrel 20 is detachably attached to a top of the lens barrel 20.

The grip portion 30 includes a handle 31 to be gripped by an operator when he holds the camera body 10 in the low-angle photography, etc., and an extension 33 that is attached to the tip of the handle 31 and extends to the front (or the object side). The grip portion 30 is fixed onto the top of the camera body 10. A viewfinder unit 40, an input unit 44, and a display 50 are provided to the grip portion 30.

The handle 31 has a rectangular-parallelepiped shape that facilitates gripping of the operator. A centerline of the handle 31 extends parallel to and above the incident optical axis B, and is placed on the plane F. The handle 31 can be gripped by four fingers other than a right thumb. The viewfinder unit 40 is attached to the back end of the handle 31, the viewfinder unit 40 is attached, and a support 32 downwardly extends from the back end of the handle 31. The support 32 is a back leg fixed onto the back end of the top surface of the camera body 10. The viewfinder 40 enables the operator to visually confirm a taken image, and an eye cup 41 is attached to the tip of the viewfinder unit 41.

The extension 33 is connected to the top of the handle 31, and made thicker than the handle 31, and configured to accommodate the display 50. The extension 33 includes a center portion 34, and a pair of protrusions 35a and 35b that protrude from both sides of the center portion 34 to the outside.

The input unit 44 configured to command and input a recording or reproducing action of the camera body 10 is provided on a top surface 34a of the center portion 34. The input unit 44 includes a switch configured to command an image recording start/stop, a switch configured to command reproducing and fast-forwarding, a zoom switch configured to command zooming in the image pickup time, and triggers.

A projection 60 is provided at the tip of the top surface 34a of the center portion 34 and upwardly projects from the top surface of the extension 33. The projection 60 includes a hollow that opens to the front and the left and right sides, and includes a forward projection 61a configured to house a microphone (not illustrated) and a backward projection 61b engaged with the forward projection 61a. Since the extension 33 is closer to the object than the handle 31, the projection 60 is closer to the object than the handle 31. Therefore, a tally lamp unit 62, which will be described later, can be easily provided to the projection 60.

Figure 3:
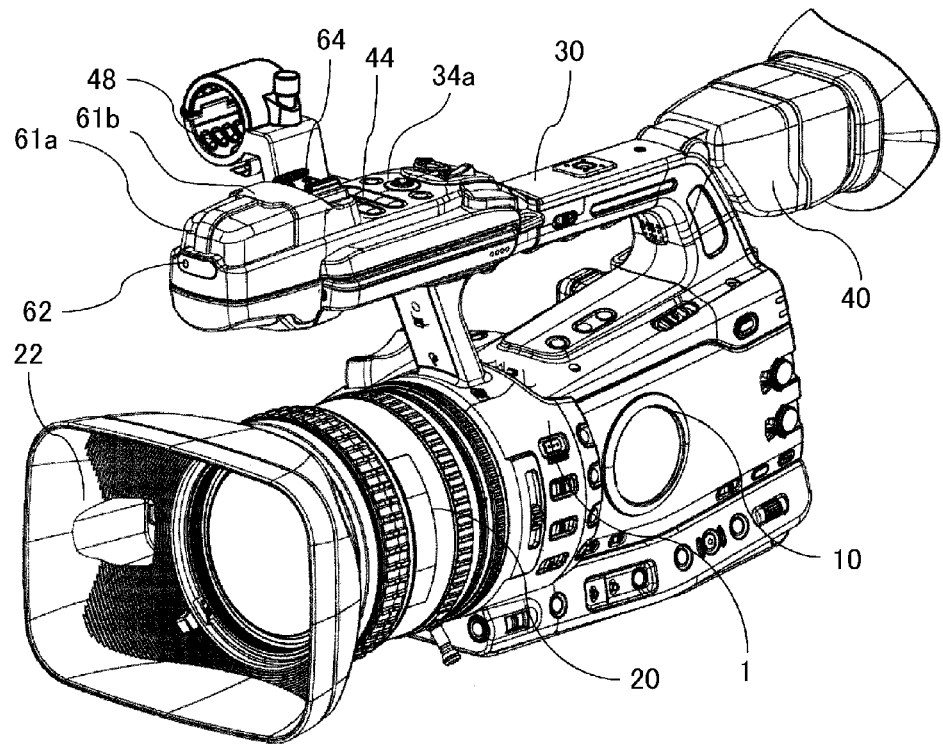
FIG. 3 is a perspective view of a front side of the video camera illustrated in FIG. 1.

FIG. 3 is a perspective view of a front side of the video camera 1. A tally lamp unit 62 configured to indicate an image pickup state is provided on a front surface of the forward projection 61a or a front surface of the extension 33 (which is a front surface of the grip portion 30 as a surface on the subject side). The tally lamp unit 62 includes an LED as a light-emitting element configured to emit light on-camera, and a subject person (object) can visually confirm that it is on camera.

However, the tally lamp unit 62 is out of sight of the operator, and he cannot use the tally lamp unit 62 to determine whether or not it is on camera. In this case, it is conceivable to use the display 50 illustrated in FIG. 1 to determine whether or not it is on camera. Nevertheless, it is difficult to view the display 50 when the photography of the video camera 1 placed on a tripod is remotely controlled or when the operator grips the grip portion 30 at a position lower than his eye level (such as a state illustrated in FIG. 2). In other words, the operator may have a difficultly to use the display 50 to visually confirm the on-camera state, and an unnecessary image pickup of a scene or missing of the image pickup may occur.

Figure 4:
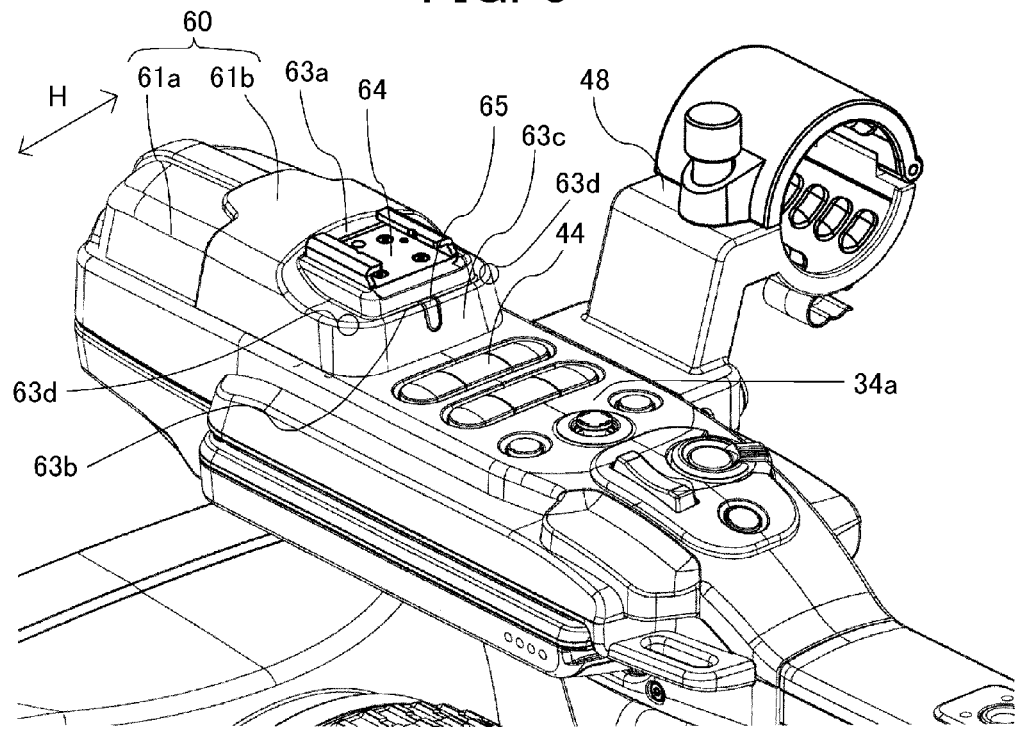
FIG. 4 is a partially enlarged perspective view of the video camera illustrated in FIG. 1.

FIG. 4 is a partially enlarged perspective view of the video camera 1. The backward projection 61b has a dent 63a, in which an accessory shoe 64 is arranged as a clip plate used to clip an accessory (external unit) (not illustrated), such as a strobe, configured to expand a function of the camera body 10. The accessory shoe 64 is provided on the backward projection 61b higher than the top surface 34a, and does not interfere with the input unit 44 in attaching or detaching the accessory.

In addition, a tally lamp unit 65 configured to inform an on-camera state is provided on the ends of a top surface 63b of the backward projection 61b and a rear surface 63c as an inclined surface. The rear surface 63c is adjacent to the top surfaces 34a and 63b, connects them with each other, and is located opposite to the object with respect to the backward projection 61b (or on the side of the input unit 44). The visual recognition improves since the tally lamp unit 65 is formed on the projection 60 at a position higher than the top surface 34a of the extension 33 and at the ends of the top surface 63b and the rear surface 63c.

Since the tally lamp unit 65 is formed on the top surface 63b, the operator can recognize the tally lamp unit 65 from the top as illustrated in FIG. 2. In addition, since the tally lamp unit 65 is provided on the extension 33 rather than the handle 31 of the grip portion 30, the operator can visually recognize the tally lamp unit 65 even when he is gripping the handle 31.

Moreover, the rear surface 63c is not perpendicular to the top surface 63b and is an inclined surface that spreads out of the top surface 63b. Thus, when the operator views the tally lamp 65 from the top, he can view not only the part of the tally lamp unit 65 which is located on the top surface 63b but also the part of the tally lamp unit 65 which is located on the rear surface 63c. Since the visual recognizable area of the tally lamp unit 65 is expanded, the visual confirmation becomes easier than a configuration that makes the rear surface 63c perpendicular to the top surface 63b.

Furthermore, since the tally lamp unit 65 is formed on the rear surface 63c, as illustrated in FIG. 1, the operator can visually recognize the tally lamp unit 65 from the back when he remotely controls the photography of the video camera 1 that is placed on the tripod. In this case, the tally lamp unit 65 is formed at a position higher than the top surface 34a of the center portion 34 of the grip portion 30.

Originally, the top surface 34a of the center portion 34 of the extension 33 is higher than the top surface of the handle 31. Therefore, the operator can easily recognize the tally lamp unit 65 from the back side across the input unit 44 and the eye cup 41.

Moreover, the tally lamp unit 65 is provided on the end of the backward projection 61b behind the accessory shoe 64 (or the accessory shoe 64 is formed closer to the object than the tally lamp unit 65).

This is because when the tally lamp unit 65 is attached in front of the accessory shoe 64 and an accessory (not illustrated) is attached to the accessory shoe 64, it becomes difficult for the operator to view the tally lamp unit 65 across the accessory. In addition, since the tally lamp unit 65 is provided to the end of the backward projection 61b and extends across the top surface 63b and the rear surface 63c, one tally lamp unit 65 enables a visual confirmation from the top and a visual confirmation from the back by the operator.

Thus, the operator can visually recognize the turning-on state of the tally lamp unit 65 from the back and from the top, and confirms the on-camera state. In addition, while the operator is operating the input unit 44 of the camera body 10 near the projection 60 opposite to the object, he can visually confirm the tally lamp unit 65 without hiding the tally lamp unit 65 by his operating fingers.

While this embodiment provides one tally lamp unit 65 at the center in an H direction of the rear surface 63c of the backward projection 61b, the position of the tally lamp unit 65 is not limited as long as the tally lamp unit 65 can be visually recognized from the top and from the back even when the accessory (not illustrated) is attached to the accessory shoe 64. For example, the tally lamp unit 65 may be provided on a corner 63d illustrated in FIG. 4. In addition, as illustrated in FIG. 4, the number of tally lamp units 65 is not limited.

Figure 5:
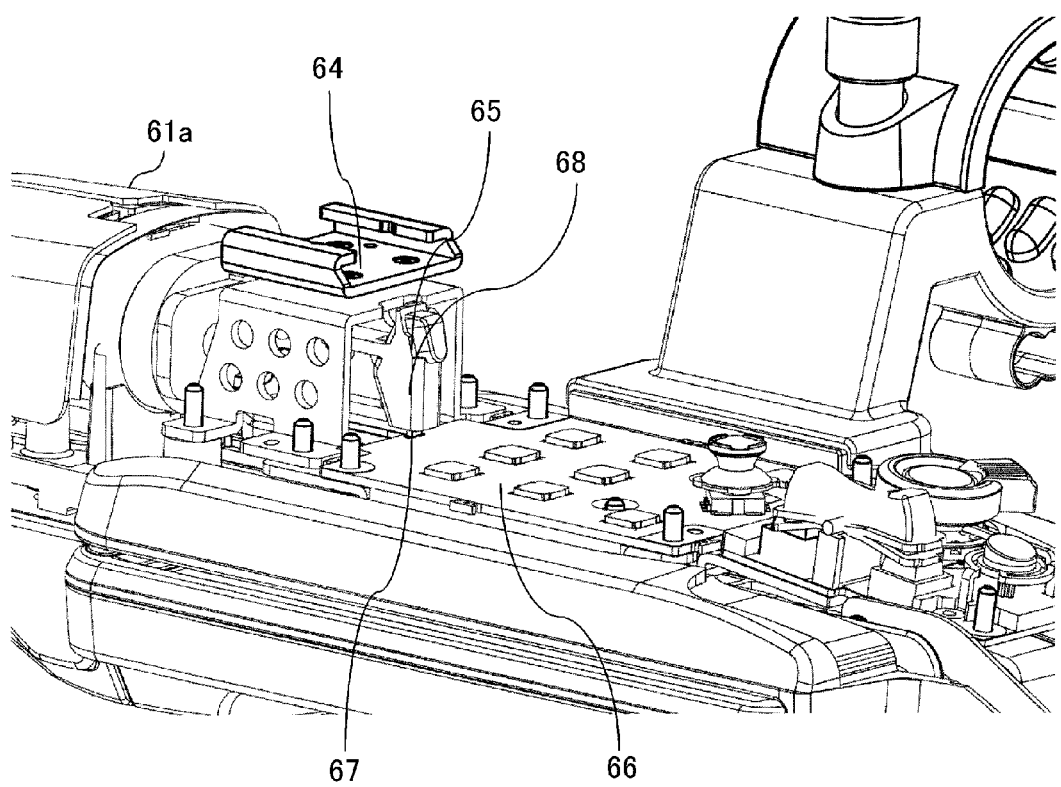
FIG. 5 is a partially enlarged perspective view for explaining an internal structure of a tally lamp illustrated in FIG. 3.

FIG. 5 is a perspective view illustrating an internal structure in which the backward projection 61b is detached from the forward projection 61a. A display LED 67 as a light-emitting element of the tally lamp unit 65 is mounted on a switch substrate 66 of the input unit 44, and the light is guided by a light guide 68.

The tally lamp unit 65 is connected to the substrate 66 of the input unit 44, and the substrate 66 of the input unit 44 is commonly used as the substrate of the tally lamp unit 65. Thereby, another substrate is unnecessary and thus the cost can be reduced.

In addition, another tally lamp unit 62 is connected to the substrate 66 of the input unit 44, and the substrate 66 of the input unit 44 is commonly used as the substrate of the tally lamp unit 62 for further cost reductions. Moreover, the light guide 68 of the tally lamp unit 65 is made of the same member as the light guide for the tally lamp unit 62 so as to guide the light to both tally lamp units 65 and 62 for cost reductions.

A slot configured to partially house the display 50 is formed under the center portion 34, and a downwardly extending support 37 is fixed onto the bottom surface of the center portion 34. The support 37 is a front leg fixed onto the front end of the top surface of the camera body 10. Thus, the grip portion 30 is attached to the camera body 10 by a pair of supports 32 and 37.

A pair of protrusions 35a and 35b protrude from the lower parts of the side surfaces of the center portion 34 in the lateral direction H and have an approximately constant width and a predetermined length in the L direction. In this embodiment, the predetermined length is a length corresponding to the length in the longitudinal direction of the display 50, but a length that can cover at least the display surface 51 f the display 50 is enough. The protrusion 35a has a finger rest for the thumb, and an external-microphone holder 48 configured to hold an external microphone, such as a gum microphone, is screwed onto the center of the protrusion 35b.

The display 50 is rotatably attached to the side of the lens barrel 20 from the grip portion 30. More specifically, the display 50 is provided so that it can be accommodated under the extension 33 of the grip portion 30 and developed from the extension 33. In addition, the developed display 50 is rotatably configured so that the angle of the display surface 51 can be varied.

The display 50 has a plane monitor, such as a liquid crystal display and an image monitor display, configured to display an image based on an image signal formed by the image pickup element or information previously stored in a memory (not illustrated). FIGS. 1 and 2 illustrate that the display 50 of the video camera 1 has rotated by 90° from a development state. Of course, the display 50 may serve as a tally lamp and indicate the on-camera state.

This embodiment discusses a video camera as an example of the image pickup apparatus, but a type of the image pickup apparatus is not limited, such as a digital still camera.

The image pickup apparatus is applicable to an application of image pickup of a subject.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-252812, filed Nov. 4, 2009, which is hereby incorporated by reference herein in its entirety.

What is claimed is:

1. An image pickup apparatus comprising:
a body to which a lens barrel is attached;
a grip portion fixed onto the body, the grip portion including a handle to be gripped in holding the body, an extension that extends from the handle to an object side, and a projection that upwardly projects from the extension;
an input unit provided on a top surface of the extension;
an accessory shoe provided on a top surface of the projection; and
a tally lamp unit configured to inform an image pickup state,
wherein the tally lamp is located behind the accessory shoe,
wherein the tally lamp is located at a position higher than the top surface of the extension, and wherein the tally lamp unit is located across an end of the top surface of the projection and an end of a rear surface of the projection.

2. The image pickup apparatus according to claim 1, wherein the top surface of the extension is higher than a top surface of the handle.

3. The image pickup apparatus according to claim 1, wherein the tally lamp unit is connected to a substrate of the input unit.

4. The image pickup apparatus according to claim 3, further comprising another tally lamp connected to the substrate of the input unit and provided on a front surface of the grip, the front surface of the grip being a surface of the grip on the object side.

5. The image pickup apparatus according to claim 4, wherein the tally lamp unit and the other tally lamp unit includes a light-emitting element and a light guide configured to guide light to both the tally lamp and the other tally lamp.

6. The image pickup apparatus according to claim 1, wherein the rear surface of the projection is an inclined surface that spreads out of the top surface of the projection.

7. The image pickup apparatus according to claim 1, wherein the tally lamp unit includes a light-emitting element which is mounted on a substrate of the input unit.

8. The image pickup apparatus according to claim 1, wherein the tally lamp unit includes a light-emitting element which is mounted on a substrate of the input unit, and a light guide member configured to guide light from the light-emitting element.

9. The image pickup apparatus according to claim 8, wherein the light guide member guides the light toward a front surface of the extension.

10. An image pickup apparatus comprising:
a body to which a lens barrel is attached;
a grip portion fixed onto the body, the grip portion including a handle to be gripped in holding the body, an extension that extends from the handle to an object side, and a projection that upwardly projects from the extension;
an input unit provided on a top surface of the extension;
an accessory shoe provided on a top surface of the projection;
a light-emitting element mounted on a substrate of the input unit;
a light guide member configured to guide light from the light-emitting element,
wherein a part of the light guide member is located behind the accessory shoe,
wherein the part of the light guide member is located at a position higher than the top surface of the extension, and wherein the part of the light guide member is located across an end of the top surface of the projection and an end of a rear surface of the projection.

11. The image pickup apparatus according to claim 10, wherein the light guide member guides the light toward a front surface of the extension.

* * * * *